(12) United States Patent
Kuwamura et al.

(10) Patent No.: US 10,941,670 B2
(45) Date of Patent: Mar. 9, 2021

(54) SEAL STRUCTURE AND TURBINE

(71) Applicant: MITSUBISHI HITACHI POWER SYSTEMS, LTD., Yokohama (JP)

(72) Inventors: Yoshihiro Kuwamura, Tokyo (JP); Eiji Konishi, Tokyo (JP); Toyoharu Nishikawa, Tokyo (JP); Shin Nishimoto, Kanagawa (JP); Hidekazu Uehara, Tokyo (JP)

(73) Assignee: MITSUBISHI POWER, LTD., Yokohama (JP)

( * ) Notice: Subject to any disclaimer, the term of this patent is extended or adjusted under 35 U.S.C. 154(b) by 0 days.

(21) Appl. No.: 15/781,814

(22) PCT Filed: Nov. 24, 2016

(86) PCT No.: PCT/JP2016/084819
§ 371 (c)(1),
(2) Date: Jun. 6, 2018

(87) PCT Pub. No.: WO2017/098932
PCT Pub. Date: Jun. 15, 2017

(65) Prior Publication Data
US 2018/0371927 A1 Dec. 27, 2018

(30) Foreign Application Priority Data

Dec. 10, 2015 (JP) .............................. JP2015-241452

(51) Int. Cl.
F01D 11/08 (2006.01)
F01D 11/00 (2006.01)
(Continued)

(52) U.S. Cl.
CPC ............ *F01D 11/001* (2013.01); *F01D 11/02* (2013.01); *F01D 11/08* (2013.01); *F16J 15/22* (2013.01);
(Continued)

(58) Field of Classification Search
CPC ........ F01D 11/001; F01D 11/08; F01D 11/12; F01D 11/122; F05D 2220/31; F05D 2240/55; F05D 2250/314
(Continued)

(56) References Cited

U.S. PATENT DOCUMENTS

2005/0214112 A1  9/2005  Rushton
2012/0043728 A1* 2/2012  Zeng ..................... F01D 11/001
                                                            277/412
(Continued)

FOREIGN PATENT DOCUMENTS

JP    2009-47043 A    3/2009
JP    2011-208602 A   10/2011
(Continued)

OTHER PUBLICATIONS

Written Opinion dated Feb. 7, 2017, issued in counterpart application No. PCT/JP2016/084819, with English translation. (12 pages).
(Continued)

Primary Examiner — Aaron R Eastman
(74) Attorney, Agent, or Firm — Westerman, Hattori, Daniels & Adrian, LLP

(57) ABSTRACT

A seal structure is for sealing leakage fluid flowing through a gap between a rotation member rotating about a rotation axis and a stationary member facing the rotation member. The seal structure includes seal fins projecting from a base that is one of the rotation and stationary members toward the other one, the seal fins being spaced apart from each other at a certain interval in an axial direction of the rotation axis; and a step section provided to the other one, the step section including step surfaces facing the seal fins and a riser surface between the adjacent step surfaces, the step surfaces and the riser surface defining a step portion. The seal fins are inclined upstream in a flow direction of the leakage fluid (Continued)

relative to a radial direction perpendicular to the rotation axis. Each seal fin and the base define a corner portion having a curved surface.

11 Claims, 2 Drawing Sheets

(51) Int. Cl.
    *F16J 15/22*     (2006.01)
    *F16J 15/447*     (2006.01)
    *F01D 11/02*     (2006.01)
    *F01D 5/22*     (2006.01)

(52) U.S. Cl.
    CPC ......... *F16J 15/447* (2013.01); *F16J 15/4472* (2013.01); *F01D 5/225* (2013.01); *F05D 2220/31* (2013.01); *F05D 2240/55* (2013.01); *F05D 2250/232* (2013.01); *F05D 2250/312* (2013.01); *F05D 2250/314* (2013.01); *F05D 2250/324* (2013.01)

(58) Field of Classification Search
    USPC ...................................................... 415/173.5
    See application file for complete search history.

(56) References Cited

U.S. PATENT DOCUMENTS

| | | |
|---|---|---|
| 2012/0288360 A1 | 11/2012 | Kuwamura et al. |
| 2013/0129493 A1 | 5/2013 | Matsumoto et al. |
| 2013/0149118 A1* | 6/2013 | Lotfi .................. F01D 11/02 415/174.5 |
| 2013/0251534 A1* | 9/2013 | Matsumoto ............. F01D 5/147 416/223 R |
| 2013/0272855 A1* | 10/2013 | Kuwamura ............. F01D 11/10 415/173.5 |
| 2015/0001812 A1 | 1/2015 | Stefanis et al. |
| 2016/0333714 A1 | 11/2016 | Matsumoto et al. |
| 2018/0163557 A1* | 6/2018 | Kuwamura ............. F01D 11/02 |

FOREIGN PATENT DOCUMENTS

| | | |
|---|---|---|
| JP | 2012-41923 A | 3/2012 |
| JP | 2012-072689 A | 4/2012 |
| JP | 2012-132397 A | 7/2012 |
| JP | 2013-19537 A | 1/2013 |
| JP | 2013-199860 A | 10/2013 |
| JP | 2015-511677 A | 4/2015 |
| JP | 2015-169077 A | 9/2015 |
| KR | 10-2012-0092161 A | 8/2012 |
| KR | 10-2014-0127328 A | 11/2014 |

OTHER PUBLICATIONS

International Search Report dated Feb. 7, 2017, issued in counterpart application No. PCT/JP2016/084819, with English translation. (6 pages).

Office Action dated Jun. 25, 2019, issued in counterpart KR Application No. 10-2018-7015664, with English translation (8 pages).

Office Action dated Nov. 26, 2019, issued in counterpart JP application No. 2015-241452, with English translation. (8 pages).

* cited by examiner

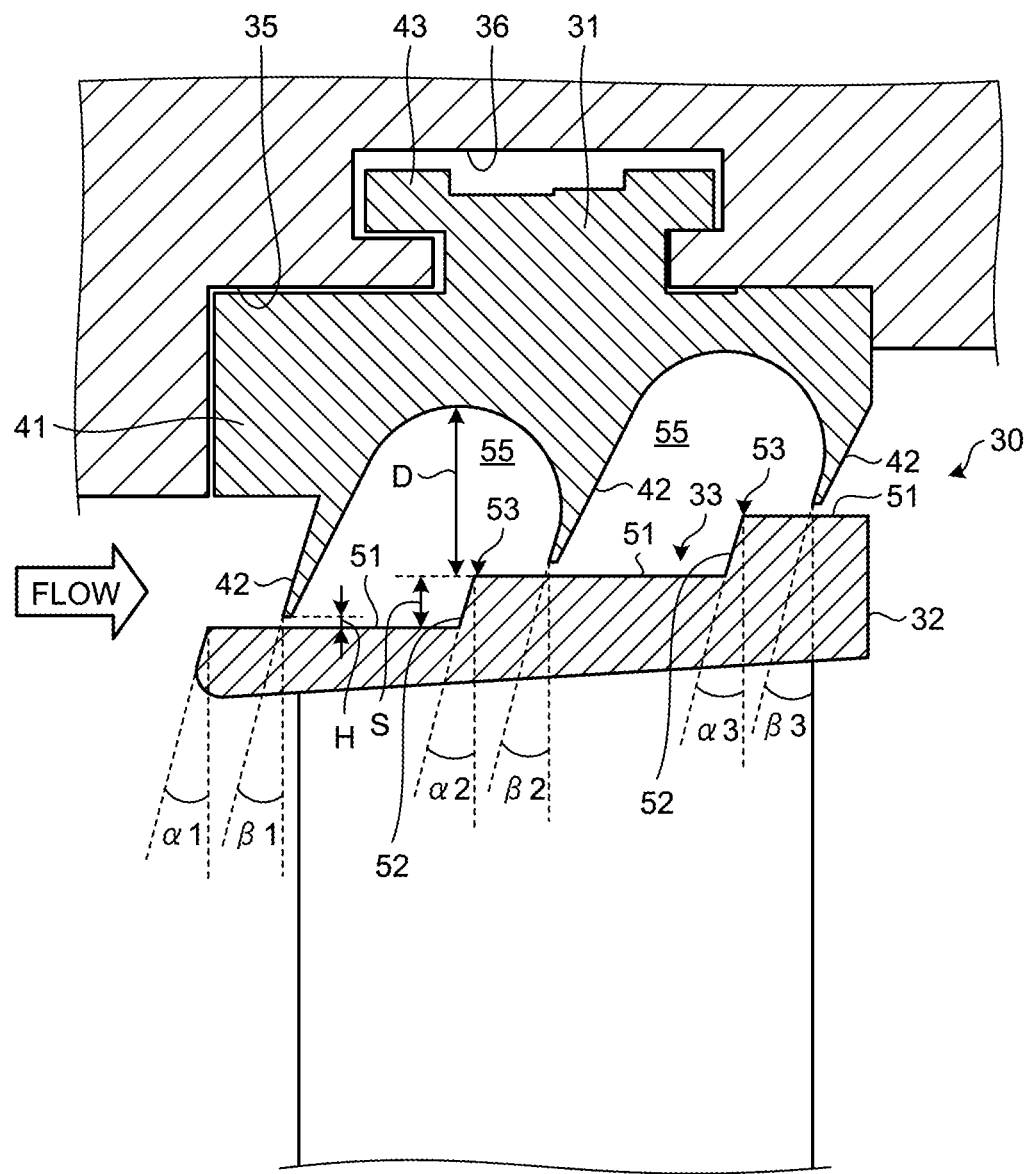

SEAL STRUCTURE AND TURBINE

FIELD

The present invention relates to a seal structure for sealing leakage fluid flowing through a gap between a rotation member and a stationary member, and a turbine.

BACKGROUND

Turbines with a seal structure have been known (see, for example, Patent Literature 1). Such turbines include a plurality of stepped parts provided to a tip shroud disposed at an end portion of each of turbine blades and seal fins provided to a casing around the turbine blades and extending toward circumferential surfaces of the stepped parts. These turbines include a plurality of cavities defined by the seal fins, the casing, and the tip shroud, and the corners of the cavities are rounded. Riser surfaces of the stepped parts have an inclined surface inclined from an upstream side toward a downstream side. Each cavity included in the turbine disclosed in Patent Literature 1 has rounded corners. The rounded corners can reduce energy loss in the main vortex created in the cavity and enhance the magnitude of the main vortex. The enhanced main vortex makes a separate vortex created in the cavity small, thereby keeping the amount of leakage fluid small.

CITATION LIST

Patent Literature

Patent Literature 1: Japanese Patent Application Laid-open No. 2013-199860

SUMMARY

Technical Problem

The seal fins of the turbine disclosed in Patent Literature 1 extend toward the stepped parts in the radial direction of the rotation axis. The seal fins guide the leakage fluid in the radial direction and the leakage fluid leaks through the clearance between the seal fins and the stepped parts. The leakage fluid flow guided by the seal fins contracts due to the effect of flow contraction. The leakage fluid flow guided by the seal fins, which extend in the radial direction, easily flows over the seal fins and out of the clearance. In this regard, there is room for enhancing the effect of flow contraction.

In view of the foregoing, it is an object of the present invention to provide a seal structure and a turbine that can reduce the amount of leakage fluid that leaks out.

Solution to Problem

A seal structure of the present invention is for sealing leakage fluid flowing through a gap between a rotation member rotating about a rotation axis and a stationary member facing the rotation member from an upstream side corresponding to one side of the rotation axis to a downstream side corresponding to the other side of the rotation axis. The seal structure includes a plurality of seal fins projecting from a base that is one of the rotation member and the stationary member toward the other one of the rotation member and the stationary member, the seal fins being spaced apart from each other at a certain interval in an axial direction of the rotation axis; and a step section provided to the other one of the rotation member and the stationary member, the step section including a plurality of step surfaces facing the seal fins and a riser surface between the adjacent step surfaces, the step surfaces and the riser surface defining a step portion. The plurality of seal fins are inclined upstream in a flow direction of the leakage fluid relative to a radial direction perpendicular to the rotation axis from the base to an end portion. Each seal fin and the base define a corner portion having a curved surface.

With this configuration, the inclined seal fins can direct the leakage fluid flowing along the seal fins in a direction opposite to the flow direction of the leakage fluid. The leakage fluid then flows in the flow direction again and leaks from a clearance between the seal fins and the step surfaces. This configuration can temporally direct the leakage fluid flow in the direction opposite to the flow direction, thereby enhancing the effect of flow contraction, which occurs when the leakage fluid flows through the clearance between the seal fins and the step surfaces. This configuration can reduce the amount of leakage fluid that leaks out.

Furthermore, the seal fins are preferably inclined at an inclination angle of $\beta$ relative to the radial direction perpendicular to the rotation axis, where the inclination angle $\beta$ is set in a range of $10° \leq \beta \leq 25°$.

With this configuration, the seal fins are inclined at the inclination angle set in the range described above, thereby enhancing the effect of flow contraction of the leakage fluid flow guided by the seal fins.

Furthermore, the plurality of seal fins are preferably inclined at the same inclination angle $\beta$.

With this configuration, all the seal fins are inclined at the same inclination angle to facilitate manufacture of the seal fins, thereby preventing increase in the manufacturing cost.

Furthermore, the plurality of seal fins preferably have a same length from the base to the end portion in a projecting direction.

With this configuration, all the seal fins have the same length to facilitate manufacture of the seal fins, thereby preventing increase in the manufacturing cost.

Furthermore, the riser surface of the step section is preferably inclined downstream in the flow direction of the leakage fluid relative to the radial direction perpendicular to the rotation axis from the step surface on an upstream side to the step surface on a downstream side.

With this configuration, part of the leakage fluid flowing along the riser surface is directed to a seal fin after the leakage fluid leaves the riser surface. The part of the leakage fluid reattaches to the seal fin and flows along the seal fin. The inclined riser surface allows the leakage fluid flowing along the riser surface to reattach to an end portion of the seal fin compared to a case where the riser surface extends radially. This configuration can reduce the size of a vortex created by the leakage fluid near the clearance between the seal fin and the step surface, thereby enhancing the effect of flow contraction.

Furthermore, the riser surface of the step section is preferably inclined at an inclination angle of $\alpha$ relative to the radial direction perpendicular to the rotation axis, and the seal fins are preferably inclined at an inclination angle of $\beta$ relative to the radial direction perpendicular to the rotation axis, where the inclination angle $\alpha$ is set in a range of $0° < \alpha \leq \beta + 30°$.

With this configuration, the riser surface is inclined at an inclination angle set in the range described above, thereby enhancing the effect of flow contraction of the leakage fluid flow reattached to the seal fin.

Furthermore, the riser surfaces are preferably inclined at the same inclination angle α.

With this configuration, all the riser surfaces are inclined at the same inclination angle to facilitate manufacture of the step section, thereby preventing increase in the manufacturing cost.

Furthermore, H is a distance between the step surface and the seal fin in the radial direction perpendicular to the rotation axis, S is a distance between the step surface on an upstream side and the step surface on a downstream side across the riser surface in the radial direction perpendicular to the rotation axis, and D is a distance between a bottom portion of a cavity defined by the adjacent seal fins and the step surface on the downstream side in the radial direction perpendicular to the rotation axis, the distance H, the distance S, and the distance D preferably satisfy a relation of 1.5H≤S≤D.

With this configuration, the distance H, the distance S, and the distance D satisfy the relation described above, thereby enhancing the effect of flow contraction of the leakage fluid flow.

Furthermore, the inclination of the seal fins preferably extends throughout a length of the seal fins from the base to the end portion.

This configuration can form the entirely inclined seal fins without bending the seal fins. In addition, this configuration allows the leakage fluid to flow along the entire length of the seal fins in a preferred manner.

A turbine of the present invention includes turbine blades as a rotation member; a casing as a stationary member; and the seal structure described above.

This configuration can reduce the amount of leakage fluid, thereby preventing reduction in work efficiency of the turbine.

Another turbine of the invention includes a rotor as a rotation member; turbine vanes as a stationary member; and the seal structure described above.

This configuration can reduce the amount of leakage fluid, thereby preventing reduction in work efficiency of the turbine.

BRIEF DESCRIPTION OF DRAWINGS

FIG. 2 is a sectional view of the seal structure according to the first embodiment.

DESCRIPTION OF EMBODIMENT

Figure 1:
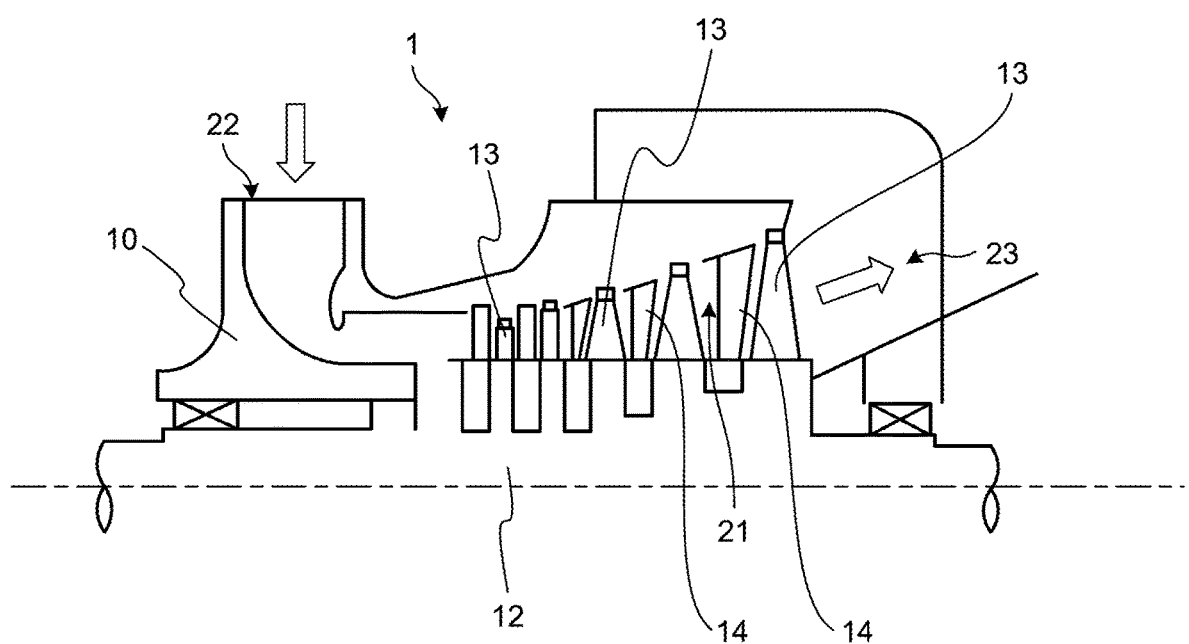
FIG. 1 is a schematic view illustrating a general configuration of a steam turbine having a seal structure according to a first embodiment of the present invention.

The following fully describes an embodiment of the present invention with reference to the accompanying drawings. The embodiment is not intended to limit the scope of the present invention. Elements of the embodiment to be described below include elements that can be easily replaced by those skilled in the art or elements that are substantially the same. Furthermore, elements to be described below can be combined as appropriate, and if two or more embodiments are described, these embodiments can also be combined.

First Embodiment

FIG. 1 is a schematic view illustrating a general configuration of a steam turbine having a seal structure according to a first embodiment of the present invention, and FIG. 2 is a sectional view of the seal structure according to the first embodiment.

A seal structure 30 according to the first embodiment is included in, for example, a steam turbine 1 and serves to seal leakage fluid leaking through a gap between a rotation member and a stationary member of the steam turbine. First, the steam turbine 1 is described with reference to FIG. 1 before the seal structure 30 is described.

As illustrated in FIG. 1, the steam turbine 1 includes a casing 10, a rotor 12 serving as a rotation axis disposed in the casing 10, multiple stages of turbine blades 13 provided to the rotor 12, and multiple stages of turbine vanes 14 provided to the casing 10.

The casing 10 has a fluid inlet 22 in which steam flows in a radial direction of the rotor 12, and a fluid outlet 23 from which the steam exits in the axial direction of the rotor 12. The casing 10 has a steam path 21 through which steam flows from the fluid inlet 22 to the fluid outlet 23. In other words, the steam path 21 is famed such that the steam flows in the radial direction at one side of the rotor 12, flows in the axial direction toward the other side of the rotor 12, and exits from the other side of the rotor 12.

The rotor 12 is rotatably supported relative to the casing 10. The multiple stages of turbine blades 13 are fixed on the outer periphery of the rotor 12 and disposed inside the steam path 21, and are spaced apart from each other at certain intervals in the axial direction of the rotor 12. The multiple stages of turbine vanes 14 are fixed on the inner perimeter of the casing 10 and disposed inside the steam path 21, and are spaced apart from each other at certain intervals in the axial direction of the rotor 12. The multiple stages of turbine blades 13 and the multiple stages of turbine vanes 14 are alternately arranged in the axial direction of the rotor 12.

When the steam is supplied from the fluid inlet 22, the steam flows through the steam path 21 and passes through the multiple stages of turbine blades 13 and turbine vanes 14. This steam flow rotates the rotor 12 via the turbine blades 13 to drive a generator, which is not illustrated, connected to the rotor 12. The steam that has passed through the multiple stages of turbine blades 13 and turbine vanes 14 exits from the fluid outlet 23 of the steam path 21.

The steam turbine 1 having the configuration discussed above includes the seal structure 30 for sealing leakage steam as the leakage fluid. The seal structure 30 is disposed in at least one of a clearance between the casing 10 as the stationary member and the turbine blades 13 as the rotation member and a clearance between the turbine vanes 14 as the stationary member and the rotor 12 as the rotation member. In the first embodiment, the seal structure 30 provided between the casing 10 and the turbine blades 13 is discussed.

As illustrated in FIG. 2, the seal structure 30 includes a seal ring 31 mounted on the inner perimeter of the casing 10 and a step section 33 famed on a tip shroud 32 provided to the end portion of each of the turbine blades 13. FIG. 2 is a sectional view of the seal structure 30 and its periphery taken along a plane perpendicular to the circumferential direction of the rotor 12.

The seal ring 31 is accommodated in a ring accommodation groove 35 annularly famed along the inner perimeter of the casing 10 and has an annular shape. The seal ring 31 has a ring main body 41 as a base, a plurality of seal fins 42 projecting from the ring main body 41 toward the turbine blades 13, and a mount portion 43 provided to the ring main body 41 close to the casing 10. The mount portion 43 has a substantially T-shaped cross-section projecting toward the opposite sides of the axial direction, and is fitted with a mount groove 36 formed at the bottom (located close to the casing 10) of the ring accommodation groove 35.

The seal fins 42 are spaced apart from each other at certain intervals in the axial direction of the rotor 12. In the first embodiment, for example, three seal fins 42 are provided and the seal fins 42 are regularly spaced apart from each other in the axial direction. The seal fins 42 are located at radially different outward positions relative to the radial direction of the rotor 12 in the flow direction of the leakage steam from the upstream side to the downstream side. With this configuration, an upstream seal fin 42 of the seal fins 42 is located at a radially inward position and a downstream seal fin 42 is located at a radially outward position.

The seal fins 42 are inclined upstream in the flow direction of the leakage steam relative to the radial direction of the rotor 12 from the ring main body 41 to the end portion. The seal fins 42 become continuously thinner in the axial direction from the ring main body 41 to the end portion, that is, the seal fins 42 taper from the ring main body 41 to the end portion. The inclination of the seal fins 42 extends throughout the length of the seal fins 42 from the ring main body 41 to the end portion.

Let the inclination angle of the seal fins 42 relative to the radial direction of the rotor 12 be $\beta$. The inclination angle $\beta$ is set in a range of "$10° \leq \beta \leq 25°$". Specifically, the inclination angle of each seal fin 42 is subtended by a tangent touching an upstream surface of the seal fin 42 at the end portion and a line extending in the radial direction of the rotor 12. The inclination angle $\beta$ is referred to as an inclination angle $\beta 1$, an inclination angle $\beta 2$, and an inclination angle $\beta 3$ in an upstream-to-downstream order in the flow direction of the leakage steam, and these inclination angles may be equal to or different from each other.

Corner portions close to the base of the seal fins 42, that is, corner portions defined by the seal fins 42 and the ring main body 41 have a curved surface with a certain radius of curvature. With this configuration, an upstream seal fin 42 and a downstream seal fin 42 define a semicircle in the sectional view illustrated in FIG. 2.

All the seal fins 42 have the same shape. Specifically, the seal fins 42 have the same length from the ring main body 41 to the end portion in the projecting direction. In addition, the seal fins 42 are inclined at the same inclination angle relative to the radial direction of the rotor 12. Accordingly, the semicircles defined by upstream seal fins 42 and corresponding downstream seal fins 42 are the same shape.

The step section 33 formed on the tip shroud 32 have a plurality of step surfaces 51 facing the seal fins 42 and riser surfaces 52 each disposed between two adjacent step surfaces 51, and the step surfaces 51 and the riser surfaces 52 define a plurality of step portions 53.

As illustrated in the sectional view of FIG. 2, the step surfaces 51 are parallel to the axial direction of the rotor 12. In the first embodiment, as many step surfaces 51, such as three, as the seal fins 42 are provided. The three step surfaces 51 are located at radially different outward positions relative to the radial direction of the rotor 12 in the flow direction of the leakage steam from the upstream side to the downstream side. With this configuration, an upstream step surface 51 of the step surfaces 51 is located at a radially inward position and a downstream step surface 51 is located at a radially outward position.

The riser surfaces 52 are inclined downstream in the flow direction of the leakage steam relative to the radial direction of the rotor 12 from the upstream step surface 51 to the downstream step surface 51. The inclination of the riser surfaces 52 extends throughout the length of the riser surfaces 52 from the upstream step surface 51 to the downstream step surface 51.

Let the inclination angle of the riser surfaces 52 relative to the radial direction of the rotor 12 be $\alpha$. The inclination angle $\alpha$ is set in a range of "$0° < \alpha \leq \beta + 30°$". All the riser surfaces 52 are inclined at the same inclination angle $\alpha$. The inclination angle $\alpha$ is referred to as an inclination angle $\alpha 1$, an inclination angle $\alpha 2$, and an inclination angle $\alpha 3$ in an upstream-to-downstream order in the flow direction of the leakage steam, and these inclination angles may differ from each other.

The seal structure 30 having the configuration discussed above includes a plurality of cavities 55 defined by the seal ring 31 and the step section 33. Each cavity 55 is defined by the ring main body 41, two adjacent seal fins 42, two adjacent step surfaces 51, and a riser surface 52 between the two step surfaces 51. The cavity 55 has a bottom portion close to the casing in the radial direction of the rotor 12.

Let the clearance (distance) between the step surface 51 and the seal fin 42 in the radial direction of the rotor 12 be H. Let the height (distance) between the upstream step surface 51 and the downstream step surface 51 across the riser surface 52 in the radial direction of the rotor 12 be S. Let the cavity depth (distance) between the bottom portion of the cavity 55 and the downstream step surface 51 in the radial direction of the rotor 12 be D. In this case, the clearance H, the height S, and the cavity depth D satisfy a relation of "$1.5H \leq S \leq D$".

When the leakage steam flows in the gap between the casing 10 and the turbine blades 13, the leakage steam flows into the upstream cavity 55 of the seal structure 30 discussed above through the clearance between the upstream seal fin 42 and the upstream step surface 51.

The leakage steam that has flowed into the cavity 55 creates a main vortex in upstream space of the cavity 55, that is, in the space in contact with the upstream step surface 51. The leakage steam creating the main vortex flows from the clearance between the seal fin 42 and the step surface 51, flows along the upstream step surface 51 and the riser surface 52, and leaves the riser surface 52. Part of the leakage steam that has left the riser surface 52 flows upstream along the bottom portion of the cavity 55 and flows along the upstream seal fin 42 back to the clearance between the seal fin 42 and the step surface 51.

The leakage steam that has flowed into the cavity 55 also creates a counter vortex in downstream space of the cavity 55, that is, in the space in contact with the downstream step surface 51. The leakage steam creating the counter vortex is part of the leakage steam that has left the riser surface 52 and the part of the leakage steam reattaches to the downstream seal fin 42 and flows along the downstream seal fin 42. Part of the leakage steam flowing along the downstream seal fin 42 flows upstream along the downstream step surface 51 and joins the leakage steam that has left the riser surface 52.

Part of the leakage steam flowing along the downstream seal fin 42 exits from the clearance between the downstream seal fin 42 and the downstream step surface 51.

According to the first embodiment as discussed above, the inclined seal fins 42 can direct the leakage steam flowing along the seal fins 42 in a direction opposite to the flow direction of the leakage steam. The leakage steam then flows in the flow direction again and leaks from the clearance between the seal fin 42 and the step surface 52. This configuration can temporally direct the leakage steam flow in the direction opposite to the flow direction, thereby enhancing the effect of flow contraction, which occurs when the leakage steam flows through the clearance between the seal fin 42 and the step surface 51. This configuration can reduce the amount of leakage steam that leaks out.

According to the first embodiment, the inclination angle β of the seal fins 42 is set in a range of "10°≤β≤25°". This configuration can enhance the effect of flow contraction of the leakage steam flowing along the seal fins 42.

According to the first embodiment, all the seal fins 42 have the same shape having, for example, the same inclination angle and the same length. This configuration facilitates the manufacture of the seal fins 42, thereby preventing increase in the manufacturing cost.

According to the first embodiment, after the leakage steam flowing along a riser surface 52 leaves the riser surface 52, part of the leakage steam reattaches to a seal fin 42 and flows along the seal fin 42. The inclined riser surface 52 allows the leakage steam flowing along the riser surface 52 to reattach to the end portion of the seal fin 42 compared to a case where the riser surface 52 extends radially. This configuration can reduce the size of the counter vortex created by the leakage steam near the clearance between the seal fin 42 and the step surface 51, thereby enhancing the effect of flow contraction.

According to the first embodiment, the inclination angle α of the riser surfaces 52 is set in a range of "0°<α≤β+30°". This configuration can enhance the effect of flow contraction of the leakage steam flow reattached to the seal fin 42.

According to the first embodiment, all the riser surfaces 52 are inclined at the same inclination angle α. This configuration facilitates manufacture of the step section 33, thereby preventing increase in the manufacturing cost.

According to the first embodiment, the clearance H, the height S, and the cavity depth D satisfy the relation of "1.5H≤S≤D". This configuration can enhance the effect of flow contraction of the leakage steam flow.

According to the first embodiment, the inclination of the seal fins 42 extends throughout the length of the seal fins 42. This configuration can form the entirely inclined seal fins 42 without bending the seal fins 42. In addition, this configuration allows the leakage steam to flow along the entire length of the seal fins 42 in a preferred manner.

According to the first embodiment, the seal structure 30 can reduce the amount of leakage steam, thereby preventing reduction in work efficiency of the steam turbine 1.

Although, in the first embodiment, the seal structure 30 is provided between the casing 10 and the turbine blades 13, the seal structure 30 may be provided between, but not limited to, the turbine vanes 14 and the rotor 12. In other words, the seal structure 30 can be used for any gap between a rotation member and a stationary member that needs to be sealed.

Although, in the first embodiment, the seal ring 31 is provided to the casing 10 that is a stationary member and the step section 33 is provided to each of the turbine blades 13 that is the rotation member, the seal ring 31 and the step section 33 may be provided vice versa. In other words, the seal ring 31 may be provided to the rotation member and the step section 33 may be provided to the stationary member.

REFERENCE SIGNS LIST

1 steam turbine
10 casing
12 rotor
13 turbine blade
14 turbine vane
21 steam path
22 fluid inlet
23 fluid outlet
30 seal structure
31 seal ring
32 tip shroud
33 step section
35 ring accommodation groove
36 mount groove
41 ring main body
42 seal fin
43 mount portion
51 step surface
52 riser surface
53 step portion
55 cavity

The invention claimed is:

1. A seal structure for sealing leakage fluid flowing through a gap between a rotation member rotating about a rotation axis and a stationary member facing the rotation member from an upstream side corresponding to one side of the rotation axis to a downstream side corresponding to the other side of the rotation axis, the seal structure comprising:

a plurality of seal fins projecting from a base that is one of the rotation member and the stationary member toward the other one of the rotation member and the stationary member, the seal fins being spaced apart from each other at a certain interval in an axial direction of the rotation axis; and a step section provided to the other one of the rotation member and the stationary member, the step section including a plurality of step surfaces facing the seal fins and a riser surface between the adjacent step surfaces, the step surfaces and the riser surface defining a step portion, wherein the plurality of seal fins are inclined upstream in a flow direction of the leakage fluid relative to a radial direction perpendicular to the rotation axis from the base to an end portion, each seal fin and the base define a corner portion having a curved surface, the riser surface of the step section is inclined downstream in the flow direction of the leakage fluid relative to the radial direction perpendicular to the rotation axis from the step surface on an upstream side to the step surface on a downstream side, the riser surface of the step section is inclined at an inclination angle of α relative to the radial direction perpendicular to the rotation axis, and the seal fins are inclined at an inclination angle of β relative to the radial direction perpendicular to the rotation axis, where the inclination angle α is set in a range of 0°<α≤β+30°.

2. The seal structure according to claim 1, wherein the seal fins are inclined at an inclination angle of β relative to the radial direction perpendicular to the rotation axis, where the inclination angle β is set in a range of 10°≤β≤25°.

3. The seal structure according to claim 2, wherein the plurality of seal fins are inclined at the same inclination angle β.

4. The seal structure according to claim 1, wherein the plurality of seal fins have a same length from the base to the end portion in a projecting direction.

5. The seal structure according to claim 1, wherein the plurality of step surfaces includes three or more step surfaces, and a plurality of the riser surfaces between the adjacent step surfaces in the three or more step surfaces are each inclined at the same inclination angle α.

6. The seal structure according to claim 1, wherein
H is a distance between the step surface and the seal fin in the radial direction perpendicular to the rotation axis,
S is a distance between the step surface on an upstream side and the step surface on a downstream side across the riser surface in the radial direction perpendicular to the rotation axis, and
D is a distance between a bottom portion of a cavity defined by the adjacent seal fins and the step surface on the downstream side in the radial direction perpendicular to the rotation axis,
the distance H, the distance S, and the distance D satisfy a relation of $1.5H \leq S \leq D$.

7. The seal structure according to claim 1, wherein the inclination of the seal fins extends throughout a length of the seal fins from the base to the end portion.

8. The seal structure according to claim 1, wherein the seal fins become continuously thinner in the axial direction of the rotation axis from the base to the end portion.

9. A turbine comprising:
turbine blades as a rotation member;
a casing as a stationary member; and
the seal structure according to claim 1.

10. A turbine comprising:
a rotor as a rotation member;
turbine vanes as a stationary member; and
the seal structure according to claim 1.

11. The seal structure according to claim 1, wherein
the base, the seal fins adjacent to each other along the axial direction of the rotation axis, two step surfaces adjacent to each other along the axial direction of the rotation axis, and the riser surface between the two step surfaces form a cavity in a defined internal space, and
an inner surface of the cavity on the downstream side is defined by the seal fin on the downstream side, an inner surface of the cavity on the upstream side is by the seal fin on the upstream side, an intermediate surface connecting between the inner surface on the downstream side and the inner surface on the upstream side is defined by the corner portion, the inner surface on the downstream side and the inner surface on the upstream side are inclined upstream from the base to the end portion as a whole, and
the intermediate surface defines a semicircle, and
the riser surface and an inclined surface of the seal fin facing the riser surface are inclined toward the same side in the flow direction of the leakage fluid.

* * * * *